US009371877B2

(12) United States Patent
Cegar et al.

(10) Patent No.: US 9,371,877 B2
(45) Date of Patent: Jun. 21, 2016

(54) SPRING AND SYSTEM

(71) Applicants: Stojan Cegar, Waigolshausen (DE); Erwin Wack, Niederwerrn (DE)

(72) Inventors: Stojan Cegar, Waigolshausen (DE); Erwin Wack, Niederwerrn (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 21 days.

(21) Appl. No.: 14/267,364

(22) Filed: May 1, 2014

(65) Prior Publication Data

US 2014/0329607 A1   Nov. 6, 2014

(30) Foreign Application Priority Data

May 6, 2013   (DE) .......................... 10 2013 208 270

(51) Int. Cl.

| F16D 3/52 | (2006.01) |
| F16F 1/06 | (2006.01) |
| F16D 3/66 | (2006.01) |
| F16F 15/123 | (2006.01) |

(52) U.S. Cl.
CPC ... F16F 1/06 (2013.01); F16D 3/66 (2013.01); F16F 15/123 (2013.01)

(58) Field of Classification Search
CPC .............. F16D 3/66; F16F 1/06; F16F 15/123
USPC .............. 464/68.9, 67.1; 267/166, 166.1, 179
See application file for complete search history.

(56) References Cited

U.S. PATENT DOCUMENTS 6,217,451 B1 *   4/2001   Kooy et al. ............... 464/67.1 X

FOREIGN PATENT DOCUMENTS

DE          102010002120 A1    9/2010

* cited by examiner

*Primary Examiner* — Gregory Binda
(74) *Attorney, Agent, or Firm* — Cozen O'Connor

(57) ABSTRACT

A spring includes at least one spring portion that extends over an arc of at least 90° when projected onto a cross-sectional area perpendicular to a force direction of the spring in an unloaded condition thereof. The spring portion has an elliptical shape in the projection. A system including one or more springs is also described.

5 Claims, 12 Drawing Sheets

SPRING AND SYSTEM

1. FIELD OF THE INVENTION

The present invention relates to a spring and a system which has at least one spring and which can be a torsional vibration damper.

2. BACKGROUND OF THE INVENTION

In many areas of technology, springs are used to absorb occurring forces. For example, springs are used to render systems vibrational in that two structural component parts are mechanically coupled by at least one spring. For purposes of mechanical coupling, there exist a number of options to enable transmission of force between these structural component parts and the at least one spring. For example, DE 10 2010 002 120 A1 is directed to a compression spring comprising spring wire wound around a spring axis. A system of this kind can be a torsional vibration damper which may also be integrated in a larger system or in another assembly.

In this regard, spring disks are used to control the spring ends of the at least one spring. However, this may incur additional costs. Also, many spring ends may not be accurately controlled by some structural component parts and the springs may depart from their intended position and can possibly cause increased wear or a total failure of the system. Thus the control of the springs can have a direct influence on the operating reliability and maintenance requirement of a system of this type. At the same time, it should be possible to implement control of the at least one spring through the relevant structural component parts by structurally simple and therefore inexpensive means as far as possible.

Therefore, there is a need for a better compromise between the manufacture of the springs, integration thereof in a system, operating reliability and maintenance requirement of a system of this type.

SUMMARY OF THE INVENTION

A spring according to one embodiment comprises at least one spring portion that extends over an arc of at least 90° when projected onto a cross-sectional area perpendicular to a force direction of the spring in an unloaded condition thereof. The spring portion has an elliptical shape in the projection. A spring of this type can be formed as a torsion spring or helical spring. This type of spring may be fashioned, for example, from a spring wire which is wound around a spring axis. The spring wire itself may be fashioned from a metallic material, for example. A metallic material of this kind may comprise, for example, a metal, a metal alloy, e.g., brass, or a metal or a metal alloy with nonmetallic constituents, i.e., steel. The metallic material can also comprise further metallic and/or nonmetallic components such as carbon fibers or glass fibers, for example.

The force direction can coincide with the spring axis. A spring according to an embodiment can be formed or used as a compression spring or tension spring. This means, for example, that it can act in opposition to forces that can compress or elongate the spring. Accordingly, the spring can be loaded in compression or loaded in tension, as the case may be, also when integrated in a system of this type.

Accordingly, a spring according to one embodiment can have at least partially a coil which is wound around the spring axis with a coil radius perpendicular to the spring axis. A spring of this type can have a constant coil radius and/or a variable coil radius. Accordingly, a spring of this kind can be designed at least partially as a helical spring or as a barrel spring or spiral spring.

The at least one spring portion can be arranged at an end of the spring, but can also be arranged at another location on the spring. By "elliptical shape" is meant herein any type of elliptical arrangement or an ellipse having two semiaxes of different size. Thus the special case of the circle, where the semiaxes are identical in size, does not constitute an ellipse. In other words, the eccentricity of the ellipse is not equal to zero. In this context, eccentricity can be defined as a square root of a difference between the square of the semi-major axis and the square of the semi-minor axis. This eccentricity is also referred to as linear eccentricity. A "projection" can mean in particular the orthogonal projection. In other words, it can be a projection of a mathematical point set perpendicular to a plane. Thus in particular, the point set can also be an extended body such as a spring or spring portion.

The elliptical shape of the spring portion can make it possible to control the spring very accurately even without the use of a spring disk individually designed for this purpose. In other words, the elliptical shape of the spring portion can facilitate control of the spring and can accordingly simplify a design of the relevant structural component part serving to control the spring. Therefore, a better compromise can be made between easier controllability of the spring, integration of the spring in a corresponding system and manufacturing effort. The manufacturing costs can possibly be reduced in this way and malfunctions prevented at the same time, but at least the frequency with which they occur can be reduced. A malfunction of this kind could be a jamming of the spring, for example.

Optionally, the spring in one embodiment can comprise an additional portion which has a circular shape in an additional projection on an additional cross-sectional area perpendicular to the force direction of the spring in the unloaded condition thereof. "Circular" may be understood here as "circular arc-shaped." By "circle" is meant herein the case where the eccentricity is equal to zero, i.e., both semiaxes are of identical size. Accordingly, this is not an ellipse in the sense defined above. The circular shape can extend over any angle, that is, for example, not only over one or more full circles in the sense of integral multiples of 360°, but also values in between. Any available installation space can be utilized more efficiently by means of a circular cross section of the additional portion of the spring.

In an embodiment of this type, a first semiaxis of the elliptical shape may optionally correspond to a radius of the circular shape of the additional portion. In other words, only one of the two semiaxes of the elliptical shape may differ from the radius of the circular shape in a spring of this type. Production can be simplified in this way. In addition or alternatively, it may also be possible to make more efficient use of the installation space.

Optionally in an embodiment of this type a second semiaxis of the elliptical shape can be smaller than the first semiaxis by a predefined value. In this case, the first semiaxis and second semiaxis of the elliptical shape may be referred to as its semi-major axis and semi-minor axis, respectively. These terms indicate again that the particular instance of the circle is excluded. A system in which a structural component part controls the spring can possibly be produced in a simpler manner in this way because a spring disk provided specifically for control, or a corresponding controlling structural component part, can be omitted if necessary. In addition or alternatively, more stability can possibly also be achieved by means of the above-described specific sizes of the semiaxes because slipping or jamming of the spring becomes less likely.

In addition or alternatively, the spring can have coils wound from a spring wire in which the spring portion comprises at least one coil and in which a pitch of the at least one coil in the spring portion is less than a pitch of a coil outside the spring portion. As was already mentioned above, the spring wire can be manufactured from different materials. A coil can present a length of spring wire that can extend over any required angle. Accordingly, aside from integral multiples of 360°, this can also be any other angle. A region of smaller pitch may be accompanied by a different spring constant. Regardless of this, implementation of the smaller pitch of the spring portion can have a positive effect on the stability of the spring portion because a risk of mechanical deformation with the spring under basic load can possibly be reduced.

In embodiments, the at least one coil in the spring portion can optionally at least partially comprise a dead coil. A dead coil can be a coil where adjoining coils at least partially contact one another. By "at least partially" is meant that the area of contact can also extend to an arc span of less than 360°. Further, all of these coils can have an elliptical shape. Also, all or some of the coils of the spring portion with the elliptical shape can optionally be arranged as dead coils, for example. Accordingly, it can be possible to further mechanically stabilize the spring or spring portion thereof if required.

In addition or alternatively, the spring portion can be arranged at an end of the spring. This can allow the spring to be integrated in the system more easily because the springs arranged in this way at an end of the spring can possibly be controlled more easily.

In addition or alternatively, the force direction can follow a shape of a circular arc segment in the embodiments. In other words, the spring that is used can also be formed as an arc spring. However, there can also be options for realizing springs having a force direction which follows the shape of a straight line. Implementation of an arc spring can make it possible to control the spring through forces at an angle relative to one another diverging from 0°, i.e., forces not acting collinearly or in parallel.

In addition or alternatively, embodiments can be directed to a spring comprising a further spring portion. In this case, the further spring portion can extend over an arc of at least 90° in a further projection on a further cross-sectional area perpendicular to the force direction of the spring in the unloaded condition thereof, and this further spring portion has an elliptical shape in the further projection. The spring portion and the further spring portion can be constructed similarly or identically with respect to one or more features or all features. Construction layouts described in the preceding and also those described in the following can relate to the spring portion and to the further spring portion independently, for example. Thus the dimensions thereof can be selected in a corresponding manner, to name only one example. The construction layouts can also relate to individual characteristics of the spring wire or spring. These characteristics can include pitch, material, load capacity, strength or geometric characteristics such as cross section, for instance. The presence of a further spring portion can make it possible to facilitate the control of the spring from a different direction.

Optionally, in an embodiment of this type the spring portion can be arranged at an end of the spring and the further spring portion can be arranged at an end of the spring remote of the aforementioned spring portion. This arrangement can possibly allow a particularly simple manufacture of the spring. In addition or alternatively, this can also make it possible at the same time to control both ends of the spring in a simpler and possibly more stable manner.

Additionally or alternatively, the spring according to an embodiment can have an intermediate portion that extends over an arc of at least 90° in an additional projection on an additional cross-sectional area perpendicular to the force direction of the spring in an unloaded condition thereof and has an additional elliptical shape in the additional projection. A semi-minor axis of the additional elliptical shape of the intermediate portion can deviate from the semi-minor axis of the elliptical shape of the spring portion. Optionally, the intermediate portion and the spring portion can be arranged adjacent to one another. In this way, it can be possible that two portions of the spring which are located next to one another or adjacently, namely, the spring portion and the intermediate portion, both have an elliptical shape, but with eccentricities which differ from one another. It may be useful, for example, to arrange a less sharply retracted intermediate portion next to a more sharply retracted spring portion in order to increase the stability of the spring under load. There two objects adjacent, no further object of the same type being arranged therebetween. Corresponding objects are directly adjacent when they adjoin one another, i.e., contact one another.

Additionally or alternatively, the spring can be ground at least at one end such that a ground face is oriented substantially perpendicular to the force direction of the spring. In this instance, "substantially perpendicular to the force direction of the spring" can mean that the angle between force direction and ground face can deviate from a right angle (90°), for example, within the framework of manufacturing precision or manufacturing tolerances. Control can be further facilitated in this way and, therefore, a more reliable operation can be ensured.

A system according to an embodiment of the invention comprises a first structural component part, a second structural component part and at least one spring according to an embodiment described above. The spring portion of the at least one spring contacts the first structural component part. Further, it is mechanically coupled with the second structural component part. Accordingly, the at least one spring has an at least partially positively engaging connection with the first structural component part, although this can be supplemented by frictionally engaging and/or bonding connection components. A mechanical coupling of two components comprises both direct and indirect coupling. A nonpositive or frictionally engaging connection is brought about by static friction, a bonding connection is brought about by molecular or atomic interactions and forces, and a positively engaging connection is brought about by a geometric connection of the relevant connection partners. Accordingly, the static friction generally presupposes a normal force component between the two connection partners.

The first structural component part as well as the second structural component part may comprise one or more parts, for example, in the form of a plurality of cover plates which can optionally be connected to one another by spacer rivets, or to other components. Accordingly, a multiple-part implementation also includes a multiple-component arrangement of the relevant components. A component of a one-piece construction means a component that is made from exactly one continuous piece of material. A component or structure which is fabricated, provided or produced in an integral manner or a component or structure fabricated, provided or produced integral with a further component or structure refers to a component or structure that cannot be separated from the at least one further component without destroying or damaging one of the at least two participating components. Accordingly, a structural component part of one-piece construction also refers at least to a structural component part which is fashioned integral with another structure of the relevant structural component part or integral structural component part.

In other words, the system can accordingly be a vibrational system. For example, the spring can serve to compensate for vibrations occurring between the first structural component part and second structural component part or also for impacts or impact-like loads. Possible applications for systems of this type may be in the area of mechanical engineering, e.g., vehicle technology, but are in no way limited to this. Accordingly, it can be possible to facilitate the control of the spring via the spring portion thereof if required. Accordingly, the control of the spring by the first structural component part can be designed in a structurally simpler manner as the case may be by means of the elliptical shape of the spring portion.

In an embodiment of this kind, the first structural component part can optionally be fabricated at least partially or also completely from a sheet-like material. In this regard, the first structural component part can contact the spring portion by an edge of the first structural component part. A sheet-like material can include, or be made of, a metallic material, for example. As has already been explained, metallic materials also include alloys of metals and nonmetals. Sheets can be produced by rolling metallic materials. But there also exist other manufacturing options. A sheet-like material can be one in which one of its three dimensions along its three linearly independent extension directions, height, length and width, is smaller than the other two by at least a predefined factor, i.e., for example, by at least an order of magnitude (at least a factor of 10). The smallest dimension can also be referred to as "thickness", and the edge of the structural component part provided from the sheet-like material refers to the extension direction of the structural component part in which the structural component part has the smallest dimension. In other words, the thickness of the structural component part is the dimension of the structural component part along the edge. Sheets can often have a thickness of only a few tens of micrometers, several hundreds of micrometers, several millimeters, or even several centimeters. Apart from this, however, there can also be heavy sheets in a greater range of thickness. Accordingly, a production of the first structural component part and, therefore, the integration of the at least one spring, can be facilitated through the use of at least one spring according to an embodiment of the invention.

Additionally or alternatively, the at least one spring can have a further spring portion in a system according to yet another embodiment. The further spring portion can extend over an arc of at least 90° in a further projection on a further cross-sectional area perpendicular to the force direction of the spring in the unloaded condition thereof, which further spring portion has an elliptical shape in the further projection. The second structural component part can contact the further spring portion by an edge of the second structural component part. This can possibly facilitate a control of the spring not only by the first structural component part but also by the second structural component part. This can make it possible, as the case may be, to facilitate integration of the spring in the system.

In a system of this kind according to an embodiment in which the at least one spring also contacts the second structural component part, the second structural component part can also optionally be manufactured at least partially or also completely from a sheet-like material. The second structural component part can contact the further spring portion by an edge of the second structural component part. Accordingly, through the use of at least one spring formed in this manner a production of the second structural component part and, therefore, the integration of the at least one spring, can be facilitated.

Accordingly, the system can comprise, for example, two structural component parts which are fabricated from a sheet-like material and which can also be referred to as plates, each of which contacts an end of the spring by its edge.

Additionally or alternatively, a system according to the invention can also be a torsional vibration damper. A torsional vibration damper of this kind, also known as vibration absorber, can be used, for example, in the field of vehicle engineering, for example, within the framework of a drivetrain of the motor vehicle. In this case, the first structural component part and/or the second structural component part can be a guide plate, a control plate, a hub disk or a central disk. But a spring according to the invention can also be used in other fields.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

Embodiments and typical implementations of the present invention will be described and explained in detail in the following with reference to the accompanying drawings in which:

FIG. 6b is another side view of the spring according to FIG. 6a, which spring is rotated by 90° relative to the view from FIG. 6a;

FIG. 7b is an enlarged fragmentary view from FIG. 7a;

FIG. 10b is another side view of the spring according to FIG. 10a, which spring is rotated by 90° relative to the view from FIG. 10a;

FIG. 11a is a side view of a spring according to the present invention in the form of an arc spring having an elliptical end segment extending over approximately 540°; and FIG. 11b is another side view of the spring according to FIG. 11a, which spring is rotated by 90° relative to the view from FIG. 11a; and FIG. 11c is a top view of the spring according to FIGS. 11a and 11b.

DETAILED DESCRIPTION OF THE PRESENTLY PREFERRED EMBODIMENTS

Figure 1:
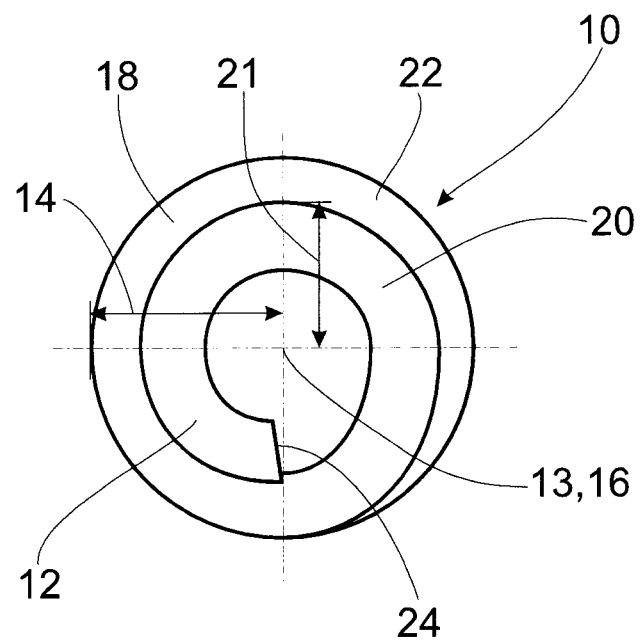
FIG. 1 is a top view showing a prior art a torsion spring.

Identical or comparable components are designated by the same reference numerals in the following description of the accompanying drawings. Further, collective reference numerals are used for components and objects which occur more than once in an embodiment or diagram but which are described collectively with respect to one or more features. Components or objects which are described with identical reference numerals or collective reference numerals may be constructed identically or possibly also differently with respect to one or more or all features, for example, their dimensions, unless otherwise explicit or implicit from the description.

FIG. 1 shows a top view of a conventional prior art compression spring 10 with a spring end 12. FIG. 1 shows compression spring 10 in viewing direction along a force direction 13 parallel to a spring axis 16. Spring end 12 has an end coil 20 having a reduced outer diameter 21 compared to an outer diameter 14 of an adjoining coil 22. More precisely, end coil 20 is retracted spirally compared to adjoining coil 22 so that its outer diameter lies completely within outer diameter 14 of adjoining coil 22 up to a free end 24 of spring end 12 of compression spring 10.

Figure 2A:
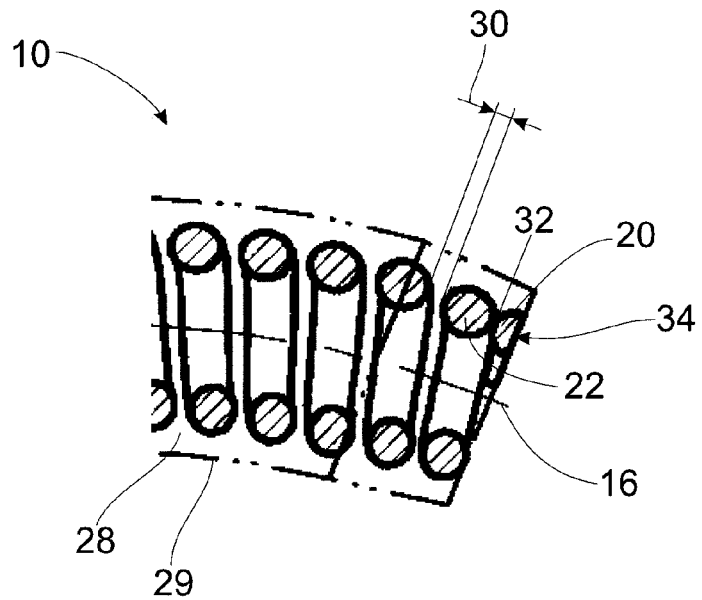
FIG. 2a is a cross-sectional view through a prior art torsion spring.

FIG. 2a shows a cross section through a further conventional prior art compression spring 10 in which spring axis 16 has a curved shape. Further, a pitch 32 of end coil 20 is reduced compared to a pitch 30 of adjoining coil 22 such that end coil 20 presents a dead coil. Accordingly, end coil 20 touches the adjacent or adjoining coil 22 such that end coil 20 is fixed in position relative to coil 22. It is not possible for end coil 20 to change position relative to adjoining coil 22 or, if so, not significantly, such that no spring effect or no significant spring effect can be achieved by end coil 20. For this reason, end coil 20 is also referred to as dead coil.

FIG. 2a shows a cross section through a plane comprising spring axis 16. Compression spring 10 can be arranged in a spring channel 28, for example. Spring channel 28 accordingly defines an available installation space 29 which is indicated in FIG. 2a by dash-dot lines. It can also be seen from this cross section that end coil 20 has a ground face 34 extending substantially perpendicular to spring axis 16. Ground face 34 can be produced by grinding spring end 20. In the compression spring 10 shown in FIG. 2a, ground face 34 is arranged precisely in such a way that it removes a portion of end coil 20. In other words, compression spring 10 is ground precisely in such a way that the above-mentioned portion of end coil 20 has been removed.

Figure 2B:
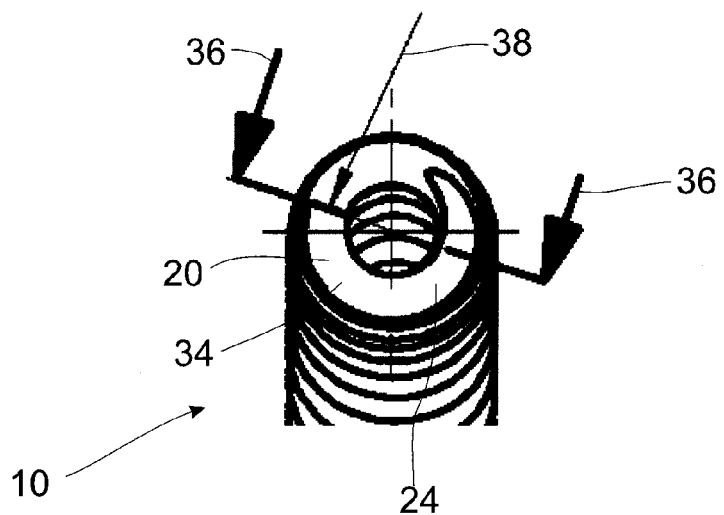
FIG. 2b is a perspective view of a prior art torsional damper.

FIG. 2b shows a perspective view of the conventional compression spring 10, wherein the viewing direction is parallel to the plane of ground face 34. Arrows 36 indicate the course of the cross-sectional area of the view shown in FIG. 2a. As is shown in FIG. 2a, end coil 20 is also continuously retracted in this conventional compression spring 10. Arrow 38 indicates a beginning of an area of free end 24 after which end coil 20 is retracted. FIGS. 1, 2a and 2b accordingly show arcuate springs with continuously retracted spring end or springs with an end coil 20 having a smaller coil radius than the other coils, for example, of adjoining coil 22. However, it can be comparatively difficult to control a compression spring 10 of this kind with these end faces.

Accordingly, as has already been mentioned, there is a need for an easier control of a spring by a corresponding structural component part within the framework of a larger system. A spring according to an embodiment which will be described more exactly in the following can make it possible to control a spring of this type even without the use of an additional control element, e.g., a spring disk. In this way it can be possible to reduce production effort and the costs incurred thereby.

Omission of a spring disk, for example, in a torsional vibration damper, can have as a result that it may not be possible under all operating conditions for ground spring end 12 to be properly controlled by a corresponding structural component part. To illustrate this in closer detail, FIG. 3 shows a perspective cross-sectional view through a conventional torsional vibration damper 40 having a hub disk 41.

Figure 3:
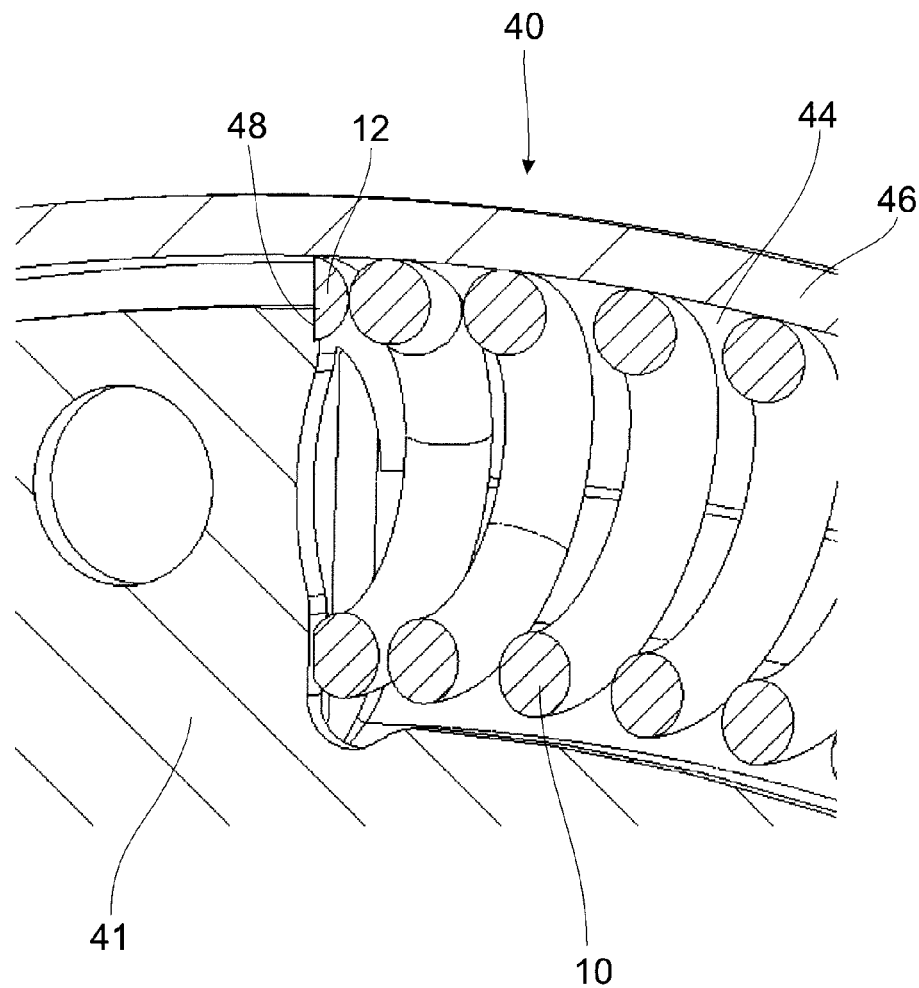
FIG. 3 is a perspective cross-sectional view through a torsional damper with a prior art spring.

FIG. 3 shows a cross section through the torsional damper 40 in which a conventional compression spring 10 is arranged in a spring channel 44 of a first cover plate 46. The torsional vibration damper 40 shown in FIG. 3 is of the type that can be used in a starting element of a drivetrain of a motor vehicle, i.e., for example, a passenger car, a truck or other utility vehicle. In this case, torque flows via the torsional vibration damper from an input side, which can be coupled to the first cover plate or which coincides with the latter, to an output side which is mechanically coupled to hub disk 41 or can coincide with the latter. Referring to a depiction of torsional vibration damper 40 where the torque flows from left to right, first cover plate 46 is arranged to the right of hub disk 41 and for this reason is also referred to as the right-hand cover plate.

A spring end 12 of the conventional compression spring 10 is formed as a ground spring end 12 in this instance. However, compression spring 10—in contrast to the compression spring 10 shown in FIGS. 1, 2a and 2b—does not have a retracted end. As is shown in FIG. 3, it is not fully supported on a shoulder 48 of hub disk 41. This deficient support can cause increased torsional strain on spring 10. In the worst case, ground spring end 12 can slip between spring channel 44, which is formed at least partially by first cover plate 46, and hub disk 41 and may possibly become wedged therein. This can cause increased wear and damage to the torsional vibration damper 40. It can also lead to an undesirable tolerance situation. Wear, damage, unfavorable tolerances and increased torsional strain are examples of causes of a failure of the torsional damper 40.

A conventional solution consists in retracting ground spring end 12 radially inward as was already explained referring to FIGS. 1, 2a and 2b. This is shown in FIG. 4.

Figure 4:
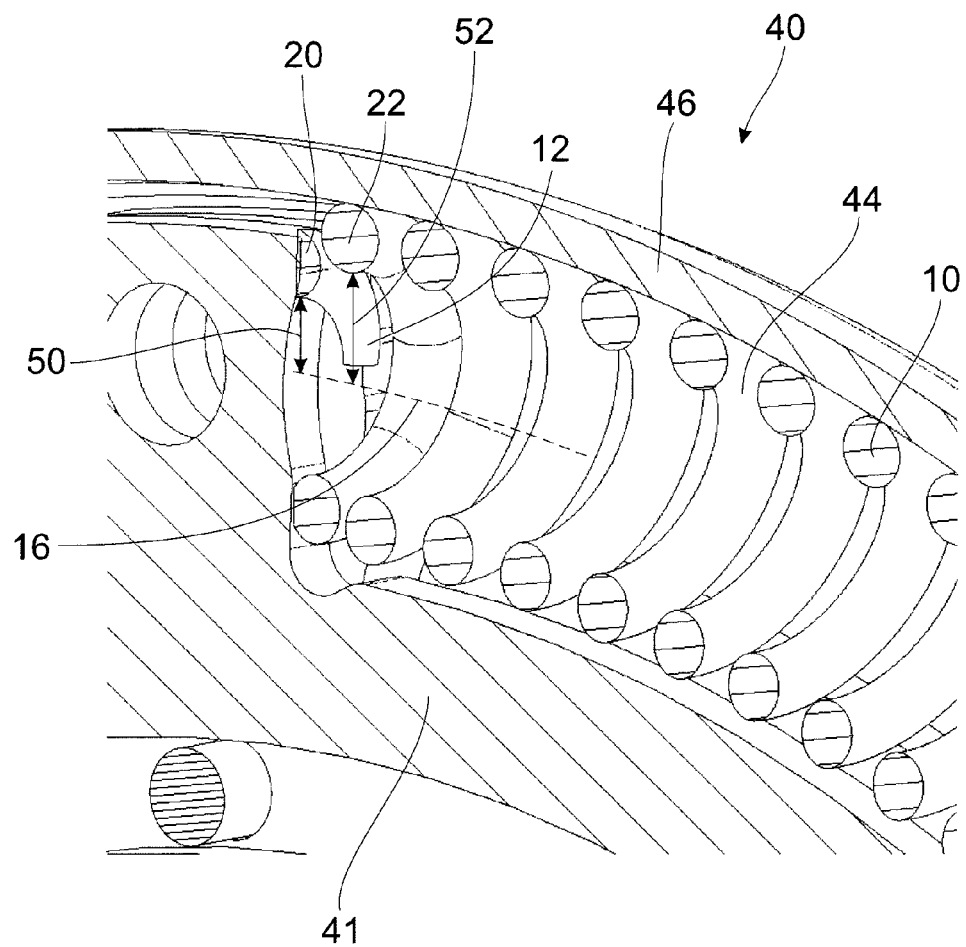
FIG. 4 is a perspective cross-sectional view through another prior art torsional damper.

FIG. 4 shows a perspective cross-sectional view through a torsional vibration damper 40 having at ground spring end 12 a reduced radius 50 of end coil 20 compared to a radius 52 of an adjoining coil 22. As was already shown and described referring to FIGS. 1, 2a and 2b, spring end 12 is completely retracted in this instance. Spring axis 16 is indicated by a dashed line. The view in FIG. 4 shows a cross section through a plane comprising spring axis 16.

Figure 5:
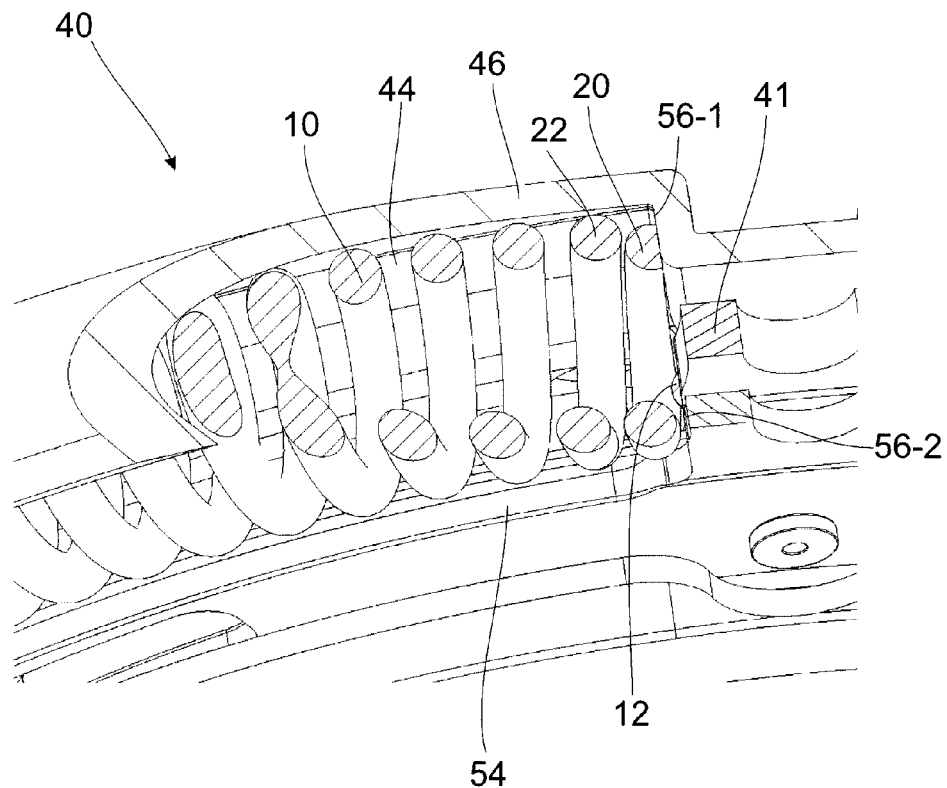
FIG. 5 is a perspective cross-sectional view through a prior art torsional vibration damper.

FIG. 5 shows a perspective cross-sectional view of a further cross section perpendicular to the cross-sectional plane from FIG. 4. FIG. 5 again shows spring 10 which is arranged in spring channel 44. Although hub disk 41 can be controlled by ground spring end 12 better than in the torsional vibration damper 40 shown in FIG. 3, problems may still arise with respect to the control of first cover plate 46 and a second cover plate 54 which is arranged on a side of hub disk 41 remote of first cover plate 46. This can happen because ground spring end 12 is not altogether completely supported on a control surface 56-1 of first cover plate 46 and of a control surface 56-2 of second cover plate 54. That is, if end coil 20 is completely retracted or spring end 12 is continuously retracted, compression spring 10 may in some cases no longer be controlled by second cover plate 54 to the intended extent. In addition or alternatively, spring end 12 can slip off a control surface 56 of first cover plate 46 or of second cover plate 54, which in the worst case can cause spring 10 to escape laterally from spring channel 44 and can accordingly lead to a failure of the torsional vibration damper 40, also referred to as damper malfunction.

In the above-described depiction of the torsional vibration damper 40 in which the torque or torque movement is transmitted from left to right, second cover plate 54 is arranged to the left of hub disk 41. For this reason, second cover plate 54 is also referred to as the left-hand cover plate. In the torsional vibration damper 40 shown here, the two cover plates 46, 54 collectively form spring channel 44 which has a circular cross section in this instance. Hub disk 41 is arranged between the two cover plates 46, 54 and is therefore also referred to as central disk.

In order to make possible an improved and, as the case may be, more reliable control of a spring by hub disk 41 and by cover plates 46, 54, a spring according to the present invention can be used. A spring of this kind is shown, for example, in FIGS. 6a to 6c. One end 68 of spring 60 is retracted elliptically in this case.

Figure 6A:
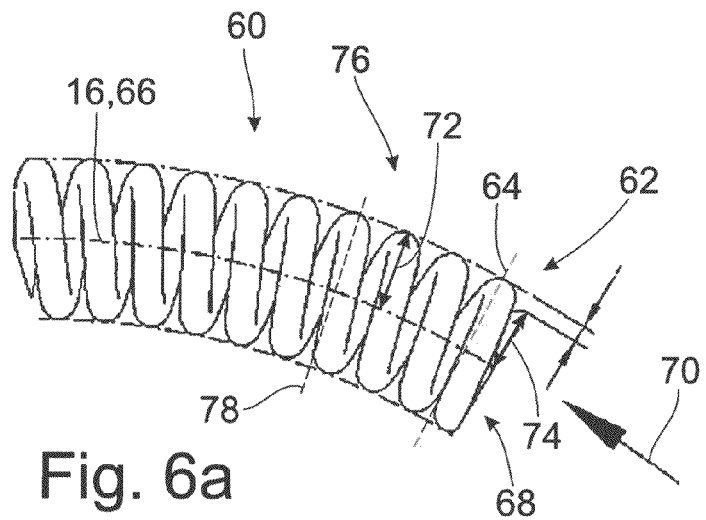
FIG. 6a is a side view of a spring according to the present invention in the form of an arc spring having an elliptical end segment extending over approximately 180°.
Figure 6B:
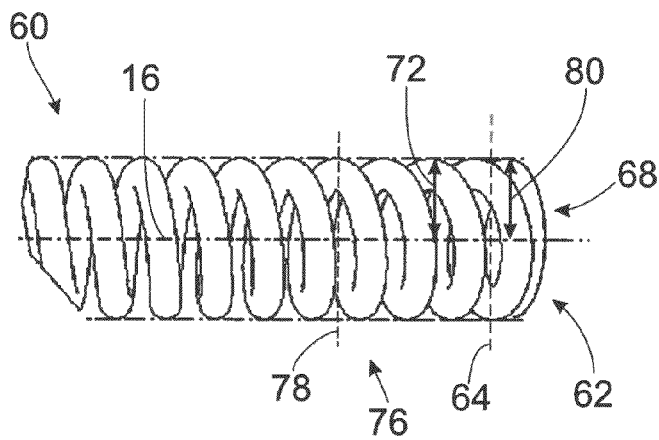

FIG. 6a shows a side view of a spring 60 according to the present invention which is designed as a compression spring in this case. Of course, other embodiments of a spring 60 can also be designed as tension springs. FIG. 6b further shows another side view of spring 60 which is rotated by 90° with respect to FIG. 6a, and FIG. 6c shows a top view of spring 60 shown in FIG. 6a.

Figure 6C:
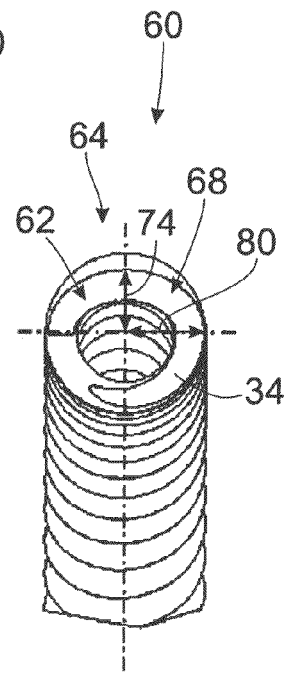
FIG. 6c is a top view of the spring according to FIGS. 6a and 6b.

Spring 60 in this case has a spring portion 62 that extends over an arc of at least 90° when projected onto a cross-sectional area 64, shown in FIG. 6c, perpendicular to force direction 66 coinciding with spring axis 16 in an unloaded condition of spring 60. In the described projection on the cross-sectional area 64, spring portion 62 has an elliptical shape. In other words, spring 60 has in spring portion 62 a shape of an ellipse, an elliptical segment or a portion of an ellipse extending over at least 90° but which can also extend over a larger angular area, i.e., for example, over at least 180°, at least 270°, at least 360° or over at least 540°. Therefore, this elliptical shape is also referred to simply as "ellipse" for the sake of brevity. In spring 60 shown here, spring portion 62 is arranged at one end 68 of spring 60 (spring end) but may also be arranged in other embodiments at a different location of spring 60 if required. Due to the elliptical shape in the region of spring portion 62 and the arrangement thereof at the end 68 of spring 60, this spring 60 is a spring 60 with an elliptically retracted end 68.

The viewing direction in FIG. 6a is perpendicular to a plane comprising spring axis 16. A large arrow 70 indicates the force direction 66 occurring in compression. Force direction 66 and spring axis 16 follow an arc-shaped or arc-segment-shaped course, i.e., a circular arc segment shape, so that spring 60 shown in FIGS. 6a to 6c is implemented as an arc spring.

FIG. 6a further shows two smaller arrows showing a difference between a radius 72 and a second semiaxis 74 of the elliptical shape in spring portion 62. Radius 72 relates to an additional portion 76 having a circular shape in an additional projection on an additional cross-sectional area 78 perpendicular to force direction 66 of spring 60 in the unloaded condition thereof. Owing to the above-described arcuate shape of force direction 66, cross-sectional areas 64, 78 are not parallel, although, of course, this may be the case in other embodiments.

The second semiaxis 74 also lies in the drawing plane. FIG. 6b shows a view in a plane that is rotated 90° relative to the view in FIG. 6a and therefore includes a first semiaxis 80. It will be seen that first semiaxis 80 corresponds to radius 72, while second semiaxis 74 deviates by a predetermined value from first semiaxis. Accordingly, the elliptical shape is not a circular shape or circular arc shape in which the two semiaxes of the "ellipse" would match. More precisely, second semiaxis 74 is smaller than first semiaxis 80 by a predetermined value in this instance. As is also shown in FIG. 6c in which the elliptical shape lies parallel to the drawing plane through the projection on cross-sectional plane 64, the elliptical shape extends over at least 180° or at least one half of a turn.

Further, in spring 60, end 68 of spring 60 is ground to enable better contact of the spring at a structural component part used for controlling it. Accordingly, the spring has at its end 68 a ground face 34 which is oriented and arranged substantially perpendicular to force direction 66 of the spring. Ground face 34 is indicated as a contour.

Spring portion 62 here is arranged at end 68 of the spring. Accordingly, when controlled by a structural component part of a system, for example, of a torsional vibration damper, elliptic inward retraction can only take place in the partial portion on the radially outer side with respect to the torsional vibration damper. In this case, spring portion 62 can extend less than 360° around spring axis 16. In this way, reduced friction can already be achieved in spring channel 44. In FIG. 6c, end 68 of spring 60 can lie in the right-hand half as well as in the left-hand half. The exact position of the end 60 of the spring can be adapted to the situation at hand, i.e., for example, the option of controlling by means of the cover plates or other structural component parts.

In addition to spring portion 62 and optional additional portion 76, a spring 60 according to the present invention can also have one or more further spring portions 62' (shown in FIG. 7c) which resemble spring portion 62 with respect to design or which can be constructed identical to or also completely different than spring portion 62. Accordingly, further spring portion 62' can also have an elliptical shape extending over at least 90°, for example, likewise in a further projection on a further cross-sectional area in an unloaded condition of spring 60. The further spring portion 62' can accordingly be arranged, for example, at a further end 68' of spring 60 opposing end 68 of spring 60. Spring portion 62, optional additional portion 76 and optional further spring portion 62' can comprise at least a portion of a coil of a spring wire, for example, when spring 60 is to be formed at least partially from a spring wire wound around a spring axis 16.

To improve the above-mentioned compromise between production of the spring and the integration and control thereof by the system, a spring 60 has at least one spring portion 62 that extends over an arc of at least 90° when projected onto the cross-sectional area 64 perpendicular to force direction 66 of spring 60 in an unloaded condition. Spring portion 62 has the elliptical shape mentioned above in the projection.

Figure 7A:
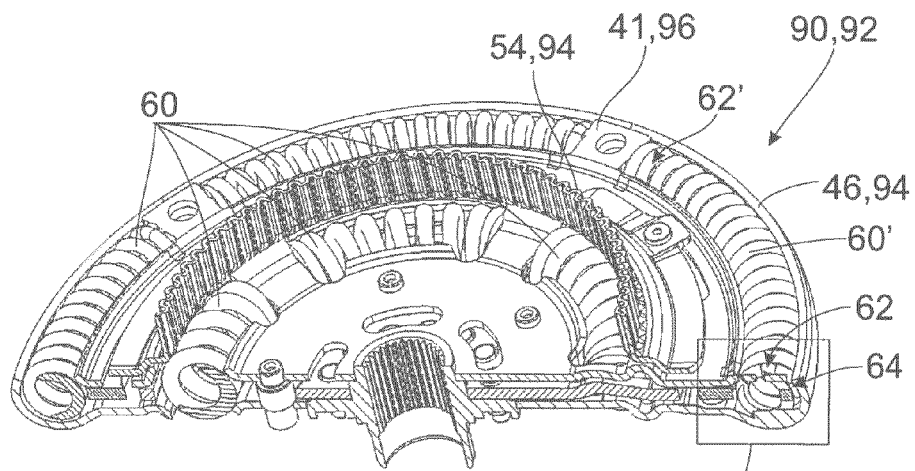
FIG. 7a is a perspective fragmentary sectional view through a system according to the present invention in the form of a torsional vibration damper.

FIG. 7a shows a perspective cross-sectional view of a system 90 according to the present invention. The system 90 is a torsional vibration damper 92. More precisely, a section is shown through this system parallel to the center axis thereof. The view is oblique to the cross-sectional plane thus formed.

The torsional vibration damper has a plurality of springs 60. Springs 60 extend over a circular portion but are arranged in part on different radii of the center axis. Springs 60 arranged on the radially outer side form a first stage of torsional vibration damper 92, while springs 60 located further radially inward form a second stage of torsional vibration damper 92. The two stages of torsional vibration damper 92 lie one behind the other in a torque path, i.e., are connected successively. However, the total number of springs 60 may vary in principle in a torsional vibration damper 92 as in another system 90. The springs designated by reference numeral 60' will be described in more detail in the following.

It should also be noted once again that the present invention is in no way limited to only the torsional vibration damper 92; rather, the applications of springs 60 presented here are merely exemplary. As regards its construction, torsional vibration damper 92 differs only slightly from the embodiments described previously. In the present instance, the torsional vibration damper again has two cover plates 46, 54 and a hub disk 41 to which springs 60' are mechanically coupled. Accordingly, at least one of the two cover plates 46, 54 which can also be constructed differently in other torsional vibration dampers 92 constitutes a first structural component part 94 and hub disk 41 constitutes a second structural component part 96, both of which are mechanically coupled to spring 60' so as to be mutually oscillating. As will be explained in the following with reference to FIG. 7b, first structural component part 94 and second structural component part 96 are both in contact with spring 60'. Accordingly, in addition to spring portion 62, spring 60' has a further spring portion 62' which can be designed substantially identical to spring portion 62. In FIG. 7a, first structural component part 94 is formed of multiple parts and comprises the two cover plates 46 and 54.

Figure 7B:
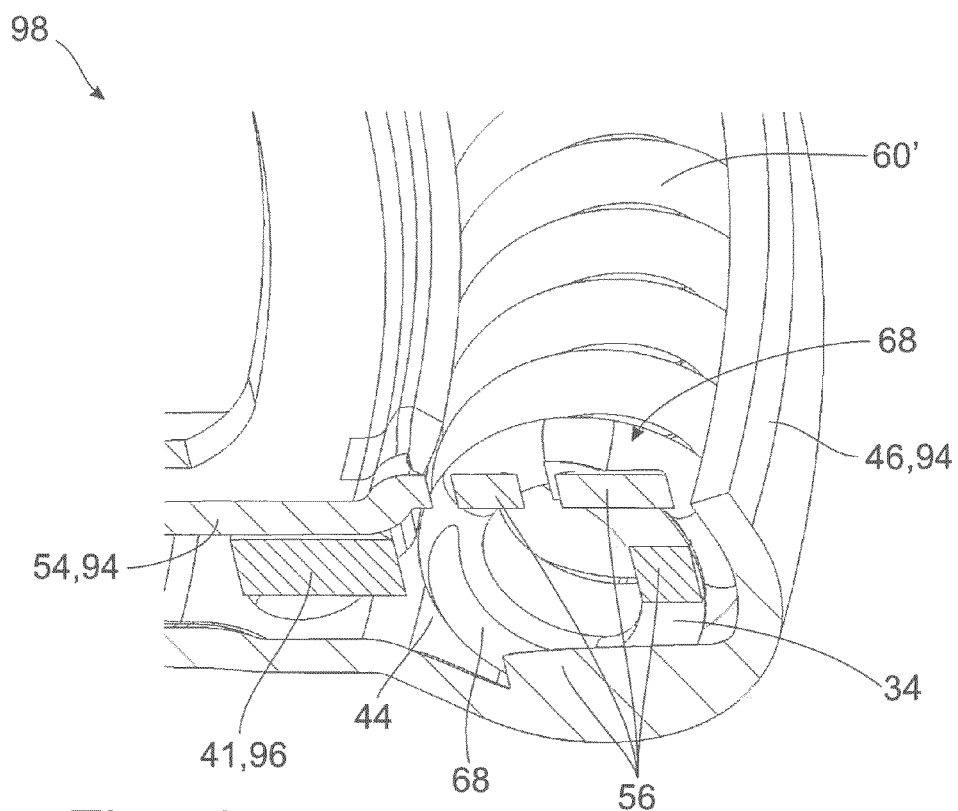
Figure 7C:
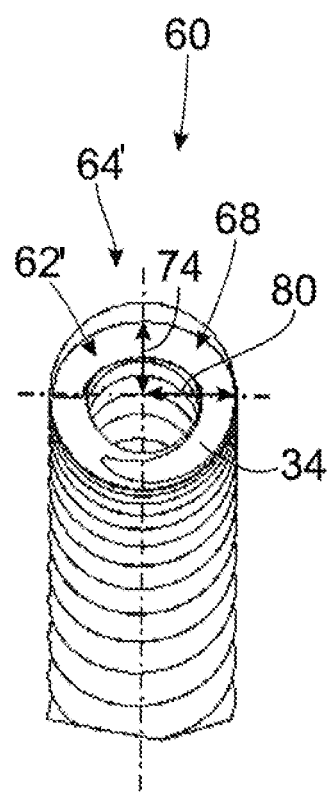
FIG. 7c is a top view of a further end of the spring according to FIGS. 6a and 6b.

A detail 98 from FIG. 7a is shown in an enlarged manner in FIG. 7b. Torsional vibration damper 92 again has two cover plates 46 and 54 and hub disk 41. Spring 60' is arranged in a spring channel 44 and almost completely fills the latter with respect to its inner diameter and an outer diameter of spring 60'. Spring channel 44 has a substantially circular cross-sectional area. Spring 60' again has an end 68 which in this case, however, is retracted elliptically. The end 68 of spring 60' accordingly represents the spring portion 62 arranged at its end.

In FIG. 7b, the elliptical shape of spring portion 62, i.e., of the last coil, extends over approximately 180°; but larger or smaller angular portions can also be considered. Spring 60' also has a ground face 34 at this end 68. Ground face 34 is largely coextensive with control surfaces 56 shown in FIG. 7b as has already been mentioned above. These are the control surfaces 56 of first cover plate 46, of second cover plate 54 and of hub disk 41. Due to the overlapping of ground face 34 with control surfaces 56, it can be possible here to enable a good control of spring 60' through cover plates 46 and 54 and also through hub disk 41.

While only spring 60' has been taken into account in the preceding description, the description can, of course, also apply to further springs 60. Conventional springs can also be used in addition to one or more springs 60 according to the present invention. Depending on the specific construction, this can be possible, for example, in a multistage torsional vibration damper 92 for the different stages thereof. Of course, this also applies to other systems 90 according to the invention.

Figure 8:
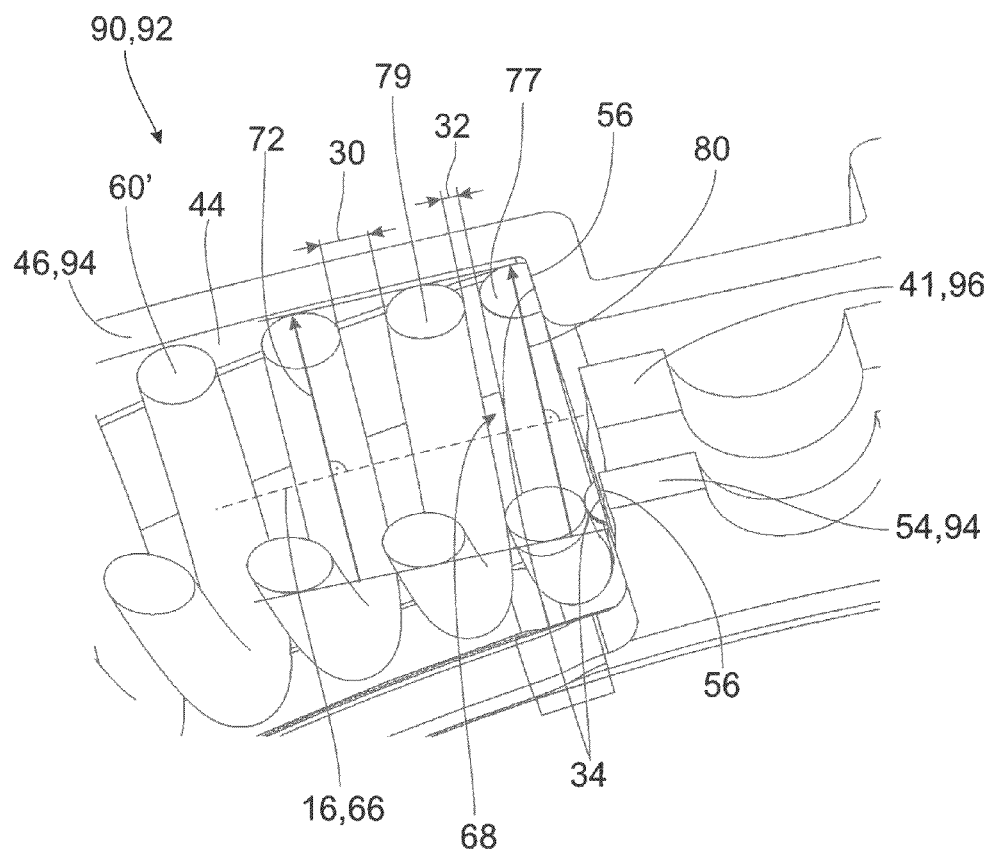
FIG. 8 is a perspective cross-sectional view through a system according to the present invention in the form of a torsional vibration damper.

FIG. 8 shows a more detailed view of spring channel 44 with spring 60' in cross section. The section plane in this case comprises the first semiaxis 80 of the elliptical shape of spring portion 62. First semiaxis 80 has the same length as a radius 72 of the circular shape in the additional projection of additional portion 76. Additional portion 76 can optionally be included and can have the above-mentioned circular shape in the additional projection on an additional cross-sectional area perpendicular to force direction 66 of spring 60' in the unloaded condition thereof. It can be seen clearly from FIG. 8 that ground face 34 is in close contact with control surfaces 56 and has a large overlap therewith. Further, as in the embodiment shown here, spring 60' can have an end coil 77 having a reduced pitch 32 compared with a pitch 30 of an adjoining coil 79. Coil 79 can be associated completely or at least partially with additional spring portion 76.

Figure 9:
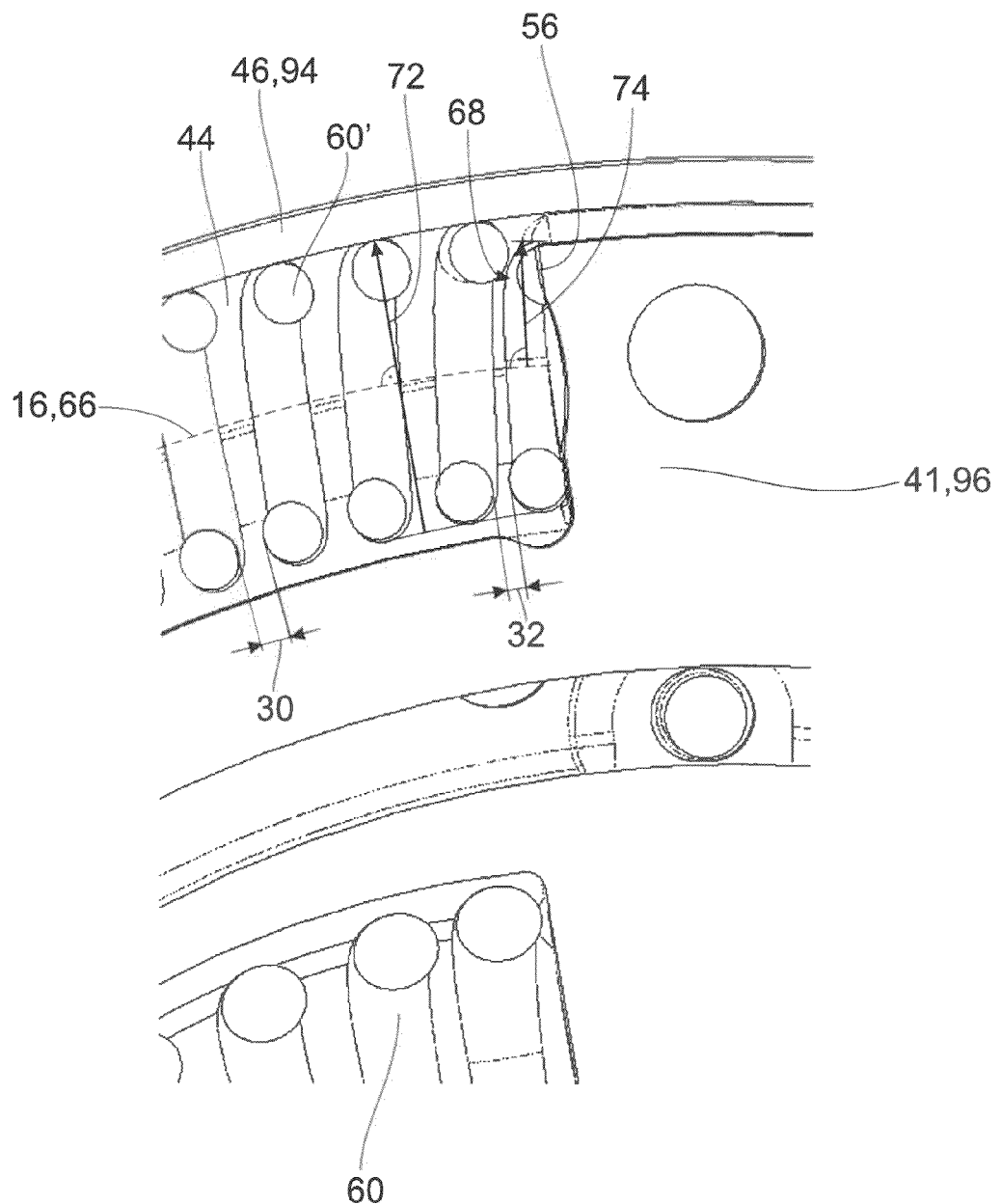
FIG. 9 is a cross-sectional view through a system according to the present invention in the form of a torsional vibration damper.

FIG. 9 shows a further cross section through a section plane through spring 60', which section plane comprises spring axis 16. Further, the section plane of FIG. 9 comprises a second semiaxis 74 of the elliptical shape of the projection of the spring portion. FIG. 9 shows that second semiaxis 74 is smaller than radius 72.

As has already been shown in FIG. 8, first semiaxis 80 of the elliptical shape in spring 60' corresponds to radius 72 of the circular shape of additional portion 76. Second semiaxis 74 of the elliptical shape is accordingly smaller than first semiaxis 80 by a predefined value. A ratio of the smaller second semiaxis 74 to the larger semiaxis 80 can be between about 80 and 98%, for example, taking into account manufacturing accuracies and manufacturing tolerances, but can also assume other values in other embodiments.

For example, a spring 60 with a cross-sectional radius of 22 mm can have a spring portion 62 with a semi-minor axis of the elliptical shape which is smaller than the semi-major axis by 0.5 mm to 4 mm. In addition or alternatively, a spring 60 can have coils wound from a spring wire 18. In this case, spring portion 62 can comprise at least one coil and a pitch 30 of the at least one coil in spring portion 62 can be smaller than a pitch 32 of a coil outside of spring portion 62. Optionally, the at least one coil in spring portion 62 can include, or can be, a dead coil at least partially. In FIG. 9, the pitch 32 of the at least one coil can be configured such that it does not present a dead coil, but can also be formed as a dead coil. For example, a dead coil can be present when pitch 32 of spring wire 18 corresponds to twice the radius or diameter- or also the strength—of spring wire 18 in a complete coil (360°). As in the embodiment shown here, spring portion 62 can be arranged at end 68 of spring 60 but also at a different location as the case may be. In the embodiments which were already shown in FIGS. 7 to 9, spring portion 62 is located at the end 68 of spring 60'. However, in other springs 60 spring portion 62 can be arranged in another part of spring 60. Springs 60 of the torsional vibration damper 92 shown in FIGS. 7 to 9 are shaped in such a way that their force directions 66 follow a shape of a circular arc segment. However, in other embodiments a different shape is also possible. Accordingly, springs 60 according to one embodiment can also have a force direction 66 that always faces in the same direction.

Further, the elliptically shaped spring portion 62 can cause a reduction in friction inside torsional vibration damper 92. The friction torque of torsional vibration damper 92 can be dependent in this case on a rotational speed because the coils are pressed into spring channel 44 by the rotational speed-dependent centrifugal force. The friction torque can be so great that the coils compress one by one because the friction force between the spring coil and spring channel 44 is correspondingly large. In this case, it can come about that spring coils of spring 60 do not push together uniformly. At a small twist angle of torsional vibration damper 92 and increased rotational speed, it may come about for this reason that only the first spring coils push together. When the last spring coil, the last spring coils or another configuration of a spring 60 is retracted, an additional effect may be a reduced friction torque under rotational speed and smaller load, since the first coil, or the first coils, does not rub against spring channel 44.

Figure 10A:
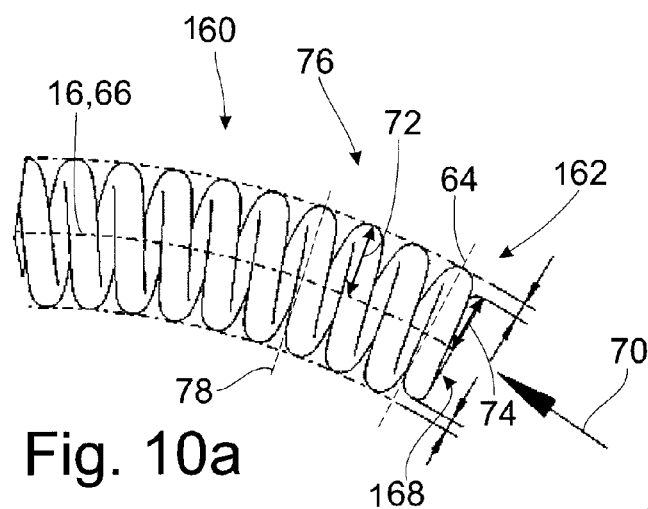
FIG. 10a is a side view of a spring according to the present invention in the form of an arc spring having an elliptical end segment extending over approximately 360°.
Figure 10B:
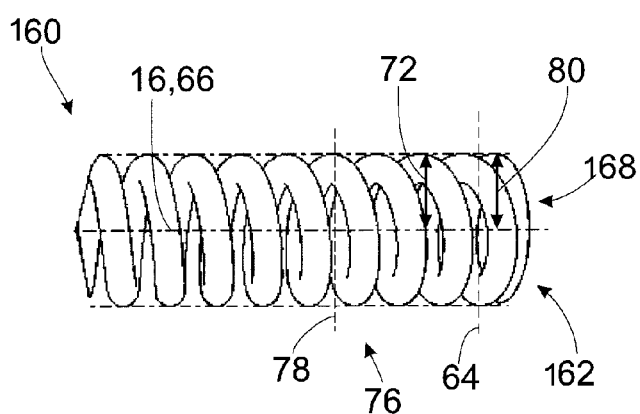
Figure 10C:
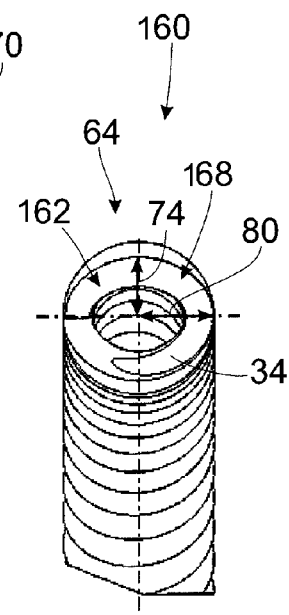
FIG. 10c is a top view of the spring according to FIGS. 10a and 10b.

FIG. 10 shows a further embodiment of a spring 160 in which spring portion 162 is also arranged at end 168 of spring 160. In other words, spring 160 also has an elliptically retracted spring end in this case. The views in FIGS. 10*a*, 10*b* and 10*c*, respectively, correspond to those in FIGS. 6*a*, 6*b* and 6*c*. In particular, it will be seen in FIGS. 10*a* and 10*c* that the elliptical shape of spring portion 162 extends approximately 360°. This can result in a greater stability depending on the arrangement of the control surfaces 56 to be controlled. In contrast to the embodiment shown in FIGS. 6*a*, 6*b* and 6*c*, the radially inner partial portion of end 168 of spring 160, i.e., of spring portion 162, can also be pressed outward in this case. This may be useful for technical reasons relating to manufacture.

Figures 11A, 11B, 11C:
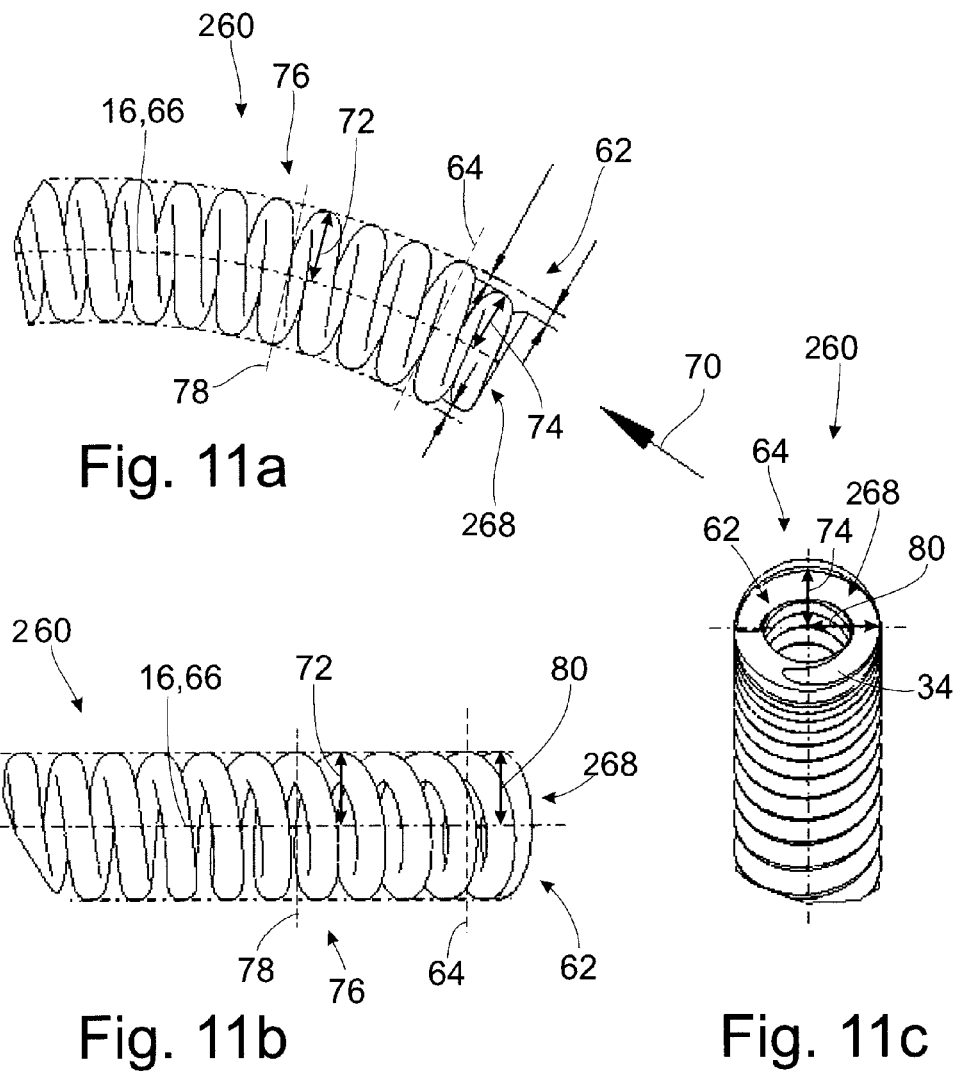

The stability can possibly be further increased by selecting a further embodiment which is shown in FIGS. 11*a*, 11*b* and 11*c*. Again, the views in FIGS. 11*a*, 11*b* and 11*c* correspond respectively to those of FIGS. 6*a*, 6*b* and 6*c*. The end 268 of spring 260 in this embodiment is retracted elliptically by 540°. In other words, this corresponds to one and one half coils (1.5 coils), which can possibly further increase the stability and, therefore, the operating reliability particularly at high loads of spring 60. If end 268 of spring 260 is retracted inward very sharply, it may be advisable that the coil located behind it is also slightly elliptically retracted. In other words, the inner portion of the second coil can accordingly be pressed outward.

If a coil is retracted, a wedge force having an intensity which can depend on the load but also on the diameter of the wire and on the retraction of end 68 of spring 60 can take effect in case of jamming of the coils. If an adjoining spring coil is likewise slightly retracted and accordingly supports the first spring coil, the wedge force and therefore also the occurring maximum tension in spring wire 18 can be reduced. Of course, two or more coils, for example, can also be elliptically retracted. However, the farther spring 60 is retracted, the greater the tendency for spring 60 to be pressed outward by the rotational speed and resulting centrifugal force. The control through hub disk 41 can again become more deficient in this way. On the other hand, the fewer the springs 60 touching spring channel 44 in operation, the lower the friction in the torsional vibration damper 92. Accordingly, the number of coils to be elliptically retracted may be decided based on the specific case or specific application. As has already been mentioned, the spring can be retracted on one side or on both sides.

The embodiments shown herein are intended as examples. Generally, the elliptical shape of the spring portion or of the end 68 of spring 60 can be at least 90° and can also have values between those shown in the variants in FIGS. 6, 10 and 11, for example, 105°, 200°, 320°, 451°, etc.

The features disclosed in the preceding description, the following claims and in the accompanying drawings may be significant and implemented individually as well as in any combination for realizing an embodiment in the various configurations thereof.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

We claim:

1. A torsional vibration damper comprising:
   a first structural component part (94) having a first and second cover plate (46, 54) forming a spring channel (44);
   a second structural component part (96) comprising a hub disc (41);
   at least one spring (60) disposed to contact the spring channel when the damper rotates, the at least one spring having a first and a second end, the spring further comprising a first elliptical spring portion (62) at the first end extending over an arc of at least 90° when projected onto a cross-sectional area (64) perpendicular to a force direction (66) of the spring (60) in an unloaded condition thereof;
   a further elliptical spring portion (62') at the second end extending over an arc of at least 90° when projected onto a further cross-sectional area (64') perpendicular to the force direction (66) of the spring (60) in an unloaded condition thereof;
   an additional spring portion (76) between the first and second end having a circular shape in an additional projection on an additional cross-sectional area (78) perpendicular to the force direction of the spring (60) in an unloaded condition thereof;
   at least one of the first and further elliptical spring portions (62, 62') of the spring (60) comprising a first semiaxis (80) having a radius (72) of the circular shape of the additional spring portion (76) and a second semiaxis (74) that is smaller than the first semiaxis (80) by a predefined value;
   wherein one of the first and further elliptical spring portions (62, 62') is in contact with the first structural component part (94); and the other one of the one of the first and further spring portion is mechanically coupled with the second structural component part (96);
   wherein the second structural component part (96) comprises an edge for contacting the further elliptical spring portion (62');
   the first and further spring portions (62, 62') comprising a ground face (34) that is, due to overlap, largely coextensive with control surfaces (56) of the first cover plate (46), the second cover plate (54) and the hub disc (41) so as to achieve, based on the overlap with the control surfaces (56), control over the spring (60) through the two cover plates (46, 56) and the hub disc (41); and wherein the vibration damper has an axis of rotation and the hub disc (41) is extending in a radial direction substantially perpendicular to the axis of rotation; the second, smaller semiaxis (74) extending in the radial direction of the hub disc (41) and the first, larger semiaxis (80) extending substantially perpendicular to the second, smaller semiaxis (74).

2. The torsional vibration damper according to claim 1, wherein the spring (60) comprises coils wound from a spring wire (18); wherein the spring portion (62) comprises at least one coil; and wherein a pitch (32) of the at least one coil in the spring portion (62) is less than a pitch (30) of a coil outside the spring portion (62).

3. The torsional vibration damper according to claim 2, wherein the at least one coil in the spring portion (62) comprises a dead coil.

4. The torsional vibration damper according to claim 1, wherein the force direction (66) of the spring follows a shape of a circular arc segment.

5. The torsional vibration damper according to claim 1, wherein the first structural component part (94) is fabricated at least partially from a sheet-like material; and wherein the first structural component part (94) contacts the spring portion (62) by an edge of the first structural component part (94).

\* \* \* \* \*